J. VANDERPOOL.
Axle Lubricator.

No. 100,342.  Patented March 1, 1870.

Witnesses:  Inventor:

United States Patent Office.

JAMES VANDERPOOL, OF HACKENSACK, NEW JERSEY.

Letters Patent No. 100,342, dated March 1, 1870.

IMPROVED DEVICE FOR OILING CARRIAGE AXLES.

The Schedule referred to in these Letters Patent and making part of the same.

*To all whom it may concern:*

Be it known that I, JAMES VANDERPOOL, of Hackensack, in the county of Bergen, State of New Jersey, have invented a new mode of Oiling Axles or Arms of Vehicles; and I do hereby declare that the following is a full and exact description thereof, reference being had to the accompanying drawing and letters of reference marked thereon.

The nature of my invention consists in oiling axles or arms of vehicles without the necessity or effort to jack-up the wheel or removing it, by the following arrangement of the parts thereof.

First, by making a suitable slot or recess in the axle or arm, running from the nut end of the same to the shoulder in the rear, and, secondly, by supplying this slot or recess with a suitable bar to fill the space thereof, said bar being made removable at pleasure, or securely confined in the slot or recess by means of a suitable device of a spring catch, when the wheel is on its place.

To enable others to make and use my invention, I will proceed to describe its construction and operation.

Figure 1:
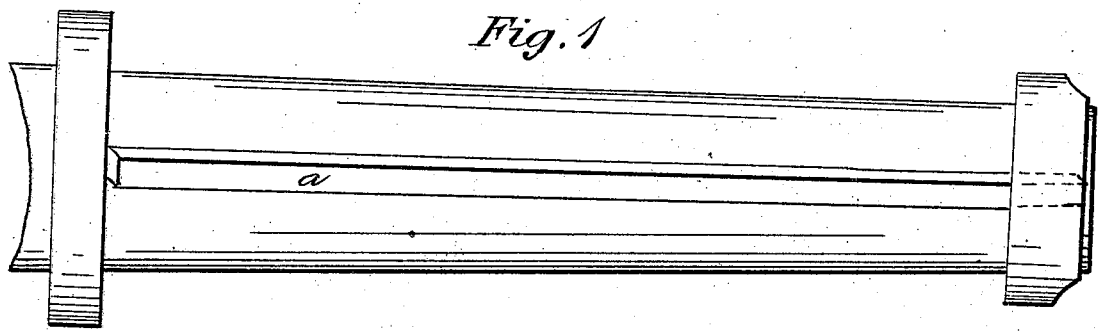
Figure 1 represents the axle or arm uncovered, with the slot or recess *a*.
Figure 2:
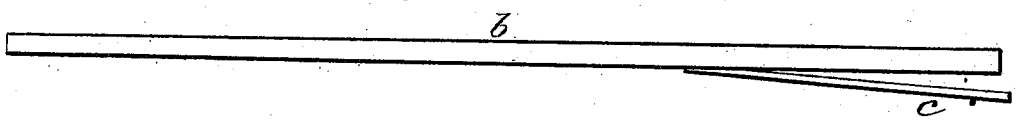
Figure 2 represents the bar *b*, with its spring catch *c*, the bar *b* being made to fill up the slot or recess *a* easily when the wheel is on the axle or arm.

When the vehicle requires oiling, the end of the spring catch *c*, which secures the bar *b* to the axle or arm, may be pressed with the fingers or nippers and dislodged from its fastening and drawn out entirely without removing the nut. If the oil is then introduced into the slot or recess by a can, to the necessary amount, the bar *b*, when introduced, will diffuse the oil thoroughly between the axle and hub by this easy and convenient arrangement, thus obviating all the liabilities of the usual custom.

What we claim, and desire to secure by Letters Patent, is not a slotted axle, but

The bar with its spring catch, in combination with a slot or recess in an axle when used as a receptacle of any kind of grease for the purpose as herein set forth.

JAMES VANDERPOOL.

Witnesses:
JOHN DEVOE,
PETER BOGER, Jr.